Sept. 8, 1931.  H. JUNKERS  1,822,036
METAL CASING
Filed Nov. 13, 1929
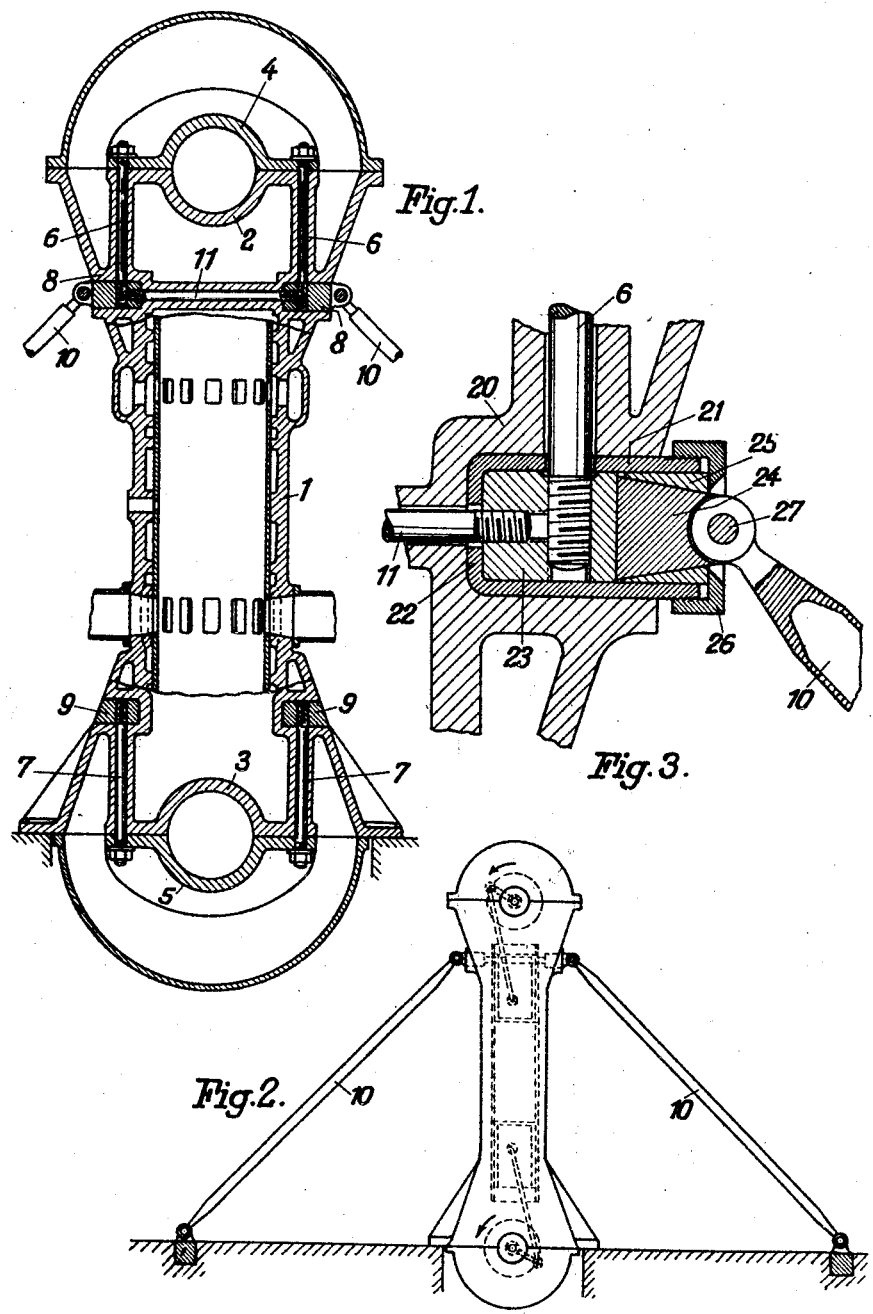
Inventor:
Hugo Junkers
by [signature]
Atty.

Patented Sept. 8, 1931

1,822,036

UNITED STATES PATENT OFFICE

HUGO JUNKERS, OF DESSAU, GERMANY

METAL CASING

Application filed November 13, 1929, Serial No. 406,964, and in Germany November 22, 1928.

My invention refers to metal casings and more especially to engine casings and to the way in which the bearings for the crank shafts are combined with the casings. It is an object of my invention to provide means for connecting the bearing caps with the casings in such manner that detrimental consequences resulting from the strain on the casings caused by the forces exerted thereon by the pistons and crank shafts are minimized.

In piston engines the power transmitted from the piston onto the crank shaft is as a rule taken up by a bearing cap which is mounted directly on the casing on the side opposite to the piston. If in engines of this kind the transmission of the piston forces by the cylinder shall be avoided, the bolts retaining the bearing cap must be made to extend to the cylinder cover (in single piston engines). However, the arrangement of long bolts is frequently difficult, more especially in the case of engines operated by twin pistons reciprocating in opposite directions, in which a separate shaft is arranged at each end of the cylinder. For in that case the bolts would be required to extend from one shaft to the other. Therefore the strains acting on the cylinder in longitudinal direction are as a rule disregarded and in light metal casings the further difficulty arises that the ends of the bolts cannot be securely fixed in the comparatively soft metal, screw threads formed in light metal being known to be little suited for taking up high strains.

According to the present invention the fixation of the bolts in the engine casing is effected in a manner by which these drawbacks are avoided. I provide for the fixation of the threaded bolt ends special members made of a mechanically strong metal such as iron or steel, which are inserted in cavities of the casing extending transversely to the axes of the bolts, so that the pull exerted on the casing by the bolts is distributed by means of these members onto a comparatively large surface. Preferably these members have the form of cylinders, cones or other rotation bodies which are fitted or forced into a correspondingly shaped cavity of the engine casing.

I thereby obtain the further advantage, that this member can also be used as a connecting point to combine the forces acting on the casing in different directions, and in vertically mounted cylinders the struts may be attached to these members.

In the drawings affixed to this specification and forming part thereof, a twin piston engine embodying my invention is illustrated diagrammatically by way of example.

In the drawings

Fig. 1 is a longitudinal section, extending axially through the cylinder in the middle portion of the figure and laterally of the cylinder in the end portions, Fig. 2 shows the manner in which an engine of this kind may be mounted in place and Fig. 3 illustrates another modification of the fixation member and the means for mounting same in place in the casing, drawn to a larger scale.

Referring first to Fig. 1, 1 is the cylinder body and 2 and 3 are the two bearings for the crank shafts, which are cast in one piece with the cylinder body. 4 and 5 are the bearing caps and 6 and 7 are the screw bolts holding the caps down on the bearings. The threaded ends of these bolts are fixed in threaded borings of cylindrical members 8, 9 which are fitted into transverse borings of the casing in such manner that their axes extend at right angles to the axes of the bolts 6 and 7. The members 8, 9 are made of a material of high strength and are therefore strong enough to hold the bolts 6, 7 in place. Being secured in plain borings with a tight fit and not requiring screw threads to hold them in place in the casing, they distribute the forces exerted on the casing by the bolts onto a comparatively large surface.

If an engine of this kind shall be mounted with the cylinders in vertical position, the struts 10 serving to brace it laterally may be attached to the members 8 which in this case are connected with each other by means of strong bolts 11 extending at right angles to the cylinder axis. These bolts 11 take up also the horizontal components of the forces exerted by the struts 10 so as to relieve the casing of these forces.

In the modification illustrated in Fig. 3 a cylindrical cup-shaped lining 21 having a bottom 22 is mounted with a tight fit in a cylindrical boring of the casing 20. In this cup 21 is arranged the cylindrical body 23 formed with screw threads for the bolts 6 and 11. At the outer end of the cylinder 23 is disposed a conical member 24 which is embraced by a conical sleeve 25 which is acted upon by a screw cap 26 mounted on the cup-shaped member 21 and forces the sleeve 25 down onto the conical member 24 which holds the cylindrical member 23 in place in the cup-shaped member 21. The conical member 24 projects through an opening in the screw cap 26 and is formed with an eye 27 for the end of the strut 10.

The arrangement here described offers the advantage that the cup-shaped member 21, which transmits the forces onto the casing 20, can remain permanently in the casing and need not be removed, whenever the engine is taken to pieces, so that a reliable seating of this member in the casing is guaranteed. The other members which are formed with screw threads etc. and may be subjected to wear, can easily be exchanged.

Obviously my invention is not limited to engines, but may as well be applied with advantage to other metal casings.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A metal casing for engines comprising a body, a part adapted to be secured to said body, an anchor block inserted in said body, means for connecting said part to said block, and means for holding said block on said body.

2. A metal casing for engines comprising a body, a part adapted to be secured to said body, an anchor block inserted in said body, means for connecting said part to said block, means for holding said block on said body, and means for securing a second part to said anchor block.

3. A metal casing for engines comprising a body, a part adapted to be secured to said body, an anchor block inserted in said body, means for connecting said part to said block, means for holding said block on said body, and means for securing a strtu to said anchor block.

4. A metal casing for engines comprising a body, a part adapted to be secured to said body, a pair of anchor blocks inserted in said body, means for connecting said part to said blocks, and means extending from one of said blocks to the other for holding said blocks on said body.

5. A metal casing for engines comprising a body, a part adapted to be secured to said body, a pair of anchor blocks inserted in said body, means for connecting said part to said blocks, means extending from one of said blocks to the other for holding said blocks on said body, and a strut secured to each of said anchoring blocks.

6. A metal casing for engines comprising a body, a part adapted to be secured to said body, an anchor block inserted in said body, means for connecting said part to said block, and means for holding said block on said body, said holding means extending at an angle to the direction in which forces are transmitted intermediate said part and said body.

7. A metal casing for engines comprising a body, a part adapted to be secured to said body, an anchor block inserted in said body, means for connecting said part to said block, and a bolt adapted to hold said block on said body.

8. A metal casing for engines comprising a body, a part adapted to be secured to said body, an anchor block inserted in said body, means for connecting said part to said block, a bolt adapted to hold said block on said body, and a thread on said bolt for engaging said block.

9. A metal casing for engines comprising a body, a part adapted to be secured to said body, an anchor block inserted in said body, means for connecting said part to said block, and a stay for holding said block on said body.

10. A metal casing for engines comprising a body, a part adapted to be secured to said body, an anchor block in the shape of a revolution body inserted in said body, means for connecting said part to said block, and means for holding said block on said body.

11. A metal casing for engines comprising a body, a part adapted to be secured to said body, a liner inserted in said body, a detachable anchoring block in said liner, means for connecting said part to said block, means for holding said block on said body, means adapted to be inserted in said liner for connecting to said block a second part, and means on said liner for retaining said connecting means in said liner and engaged with said block.

12. A metal casing for engines comprising a body, a part adapted to be secured to said body, a liner inserted in said body, a detachable anchoring block in said liner, means for connecting said part to said block, means for holding said block on said body, means adapted to be inserted in said liner for connecting to said block a second part, and means including a tapering sleeve, and means for exerting thrust on said sleeve; on said liner for retaining said connecting means in said liner and engaged with said block.

13. A frame for an internal combustion engine comprising a cylinder, a bearing at one end of said cylinder, a bearing cap on said bearing, anchor blocks inserted in said body, stays extending in parallel to said cylinder, arranged in groups and connecting said cap to said anchor blocks. and transverse stays connecting the anchor blocks allotted to each group of parallel stays.

14. A frame for an internal combustion engine comprising a cylinder, a bearing at one end of said cylinder, a bearing cap on said bearing, anchor blocks inserted in said body, stays extending in parallel to said cylinder, arranged in groups and connecting said cap to said anchor blocks, transverse stays connecting the anchor blocks allotted to each group of parallel stays, and struts secured to said anchor blocks.

In testimony whereof I affix my signature.

HUGO JUNKERS.